(12) United States Patent
Shih et al.

(10) Patent No.: US 7,391,930 B2
(45) Date of Patent: Jun. 24, 2008

(54) ANGLE DE-SKEW DEVICE AND METHOD THEREOF

(75) Inventors: Yu-Ting Shih, Taipei (TW); Ching-Lung Mao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 606 days.

(21) Appl. No.: 11/013,737

(22) Filed: Dec. 17, 2004

(65) Prior Publication Data

US 2006/0133692 A1    Jun. 22, 2006

(51) Int. Cl.
*G06K 9/36* (2006.01)
*H04N 1/04* (2006.01)

(52) U.S. Cl. ........................... 382/289; 358/488

(58) Field of Classification Search ......... 382/289–296, 382/305, 312; 358/474–475, 486, 488; 178/18.01
See application file for complete search history.

(56) References Cited

U.S. PATENT DOCUMENTS

| | | | | |
|---|---|---|---|---|
| 5,001,766 A | * | 3/1991 | Baird | 382/290 |
| 5,054,098 A | * | 10/1991 | Lee | 382/289 |
| 5,115,107 A | * | 5/1992 | Crooks et al. | 345/178 |
| 5,245,676 A | * | 9/1993 | Spitz | 382/235 |
| 5,563,403 A | * | 10/1996 | Bessho et al. | 250/208.1 |
| 5,583,956 A | * | 12/1996 | Aghajan et al. | 382/290 |
| 5,777,898 A | * | 7/1998 | Teterwak | 702/95 |
| 6,282,326 B1 | * | 8/2001 | Lee et al. | 382/289 |
| 6,421,458 B2 | * | 7/2002 | Michael et al. | 382/151 |
| 6,912,325 B2 | * | 6/2005 | Rombola et al. | 382/289 |

FOREIGN PATENT DOCUMENTS

TW            00178690            2/1992

\* cited by examiner

*Primary Examiner*—Kanjibhai Patel
(74) *Attorney, Agent, or Firm*—Rabin & Berdo, P.C.

(57) ABSTRACT

An angle de-skew device and the method thereof are used in an image processing system to rotate a skewed image with respect to a reference point as a rotated center. First and second accumulator circuits respectively are used to accumulate first and second offsets for the X coordinates and Y coordinates of the first pixel in the skewed image, and respectively output the sums into the image processing system. A counter is connected to the two accumulator circuits to control the number of accumulation times.

7 Claims, 7 Drawing Sheets

ANGLE DE-SKEW DEVICE AND METHOD THEREOF

BACKGROUND

1. Field of Invention

The invention relates to an image processing technique for skewed images and, in particular, to an angle de-skew device and method thereof to rotate a skewed image by an angle in order to obtain a better output image.

2. Related Art

The digital processing system usually uses a rectangular grid of pixels to represent an image. A 24-bit digital processing system is defined in terms of the red, green, and blue colors, each of which is represented by 8 bits. That is, each color has 256 levels (from the darkest to the brightest). However, the image may be skewed or misaligned from the corresponding rectangular grid during the scanning process. In particular, during the scanning process, a physical image is converted into binary information linked to a digital computer system.

For example, suppose a scanning device obtains an image. If the paper of the original image is not correctly placed on the scanning platform, the obtained image output to the image processing system will be skewed. Therefore, the image is not desirable if it is displayed or printed. Currently, there are many methods to correct skewed images.

Figure 1:
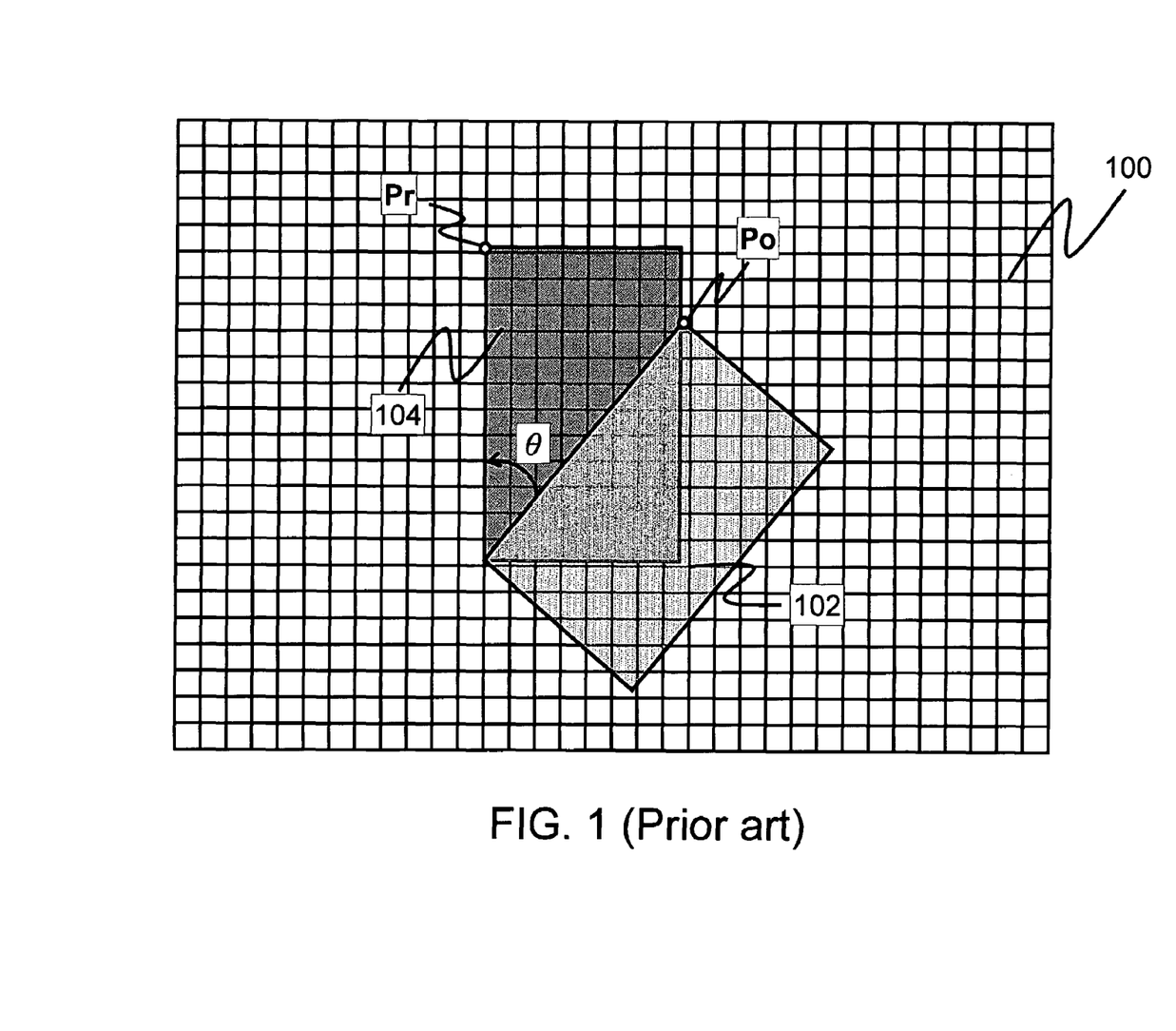
FIG. 1 is a schematic view of the image processing technique for skewed images in the prior art.

With reference to FIG. 1, a de-skewing method is to rotate a skewed original image 102 on the rectangular grid 100 of pixels by a skew angle θ, thereby obtaining a less skewed image 104. The conventional method makes use of sine/cosine functions in image rotations. That is, they use the sine/cosine functions to compute the rotated image coordinates. The rotation formulas are given by $$Xr = Xo \times \text{Cosine}(\theta) \quad (1)$$

$$Yr = Yo \times \text{Sine}(\theta) \quad (2)$$

where (Xo, Yo) are the pixel coordinates of Po in the original image 102, and (Xr, Yr) are the pixel coordinates of Pr in the rotated image 104.

Here Eqs. (1) and (2) require the use of two multipliers and sine/cosine functions to achieve the rotation. However, the multipliers for coordinate transformation are big and the computation of sine/cosine functions is very time-consuming and power-consuming.

An image rotation method and a corresponding image rotation device to rotate an M×N original image by an angle θ is disclosed in the R.O.C. Pat. No. 178690. The method includes the following steps. First, set first initial values (n, m) after the unit (1, 0) on the X-axis of original image coordinate (Xo, Yo) is rotate by θ, where n=Cosine (θ), m=Sine (θ). Then set second initial values (−m, n) after the unit (0, 1) on the Y-axis of original image coordinate (Xo, Yo) is rotated by θ, where n=Cosine (θ), and m=Sine (θ). At the same time, the second initial values (−m, n) are added to the first initial values (n, m). Afterwards, the rotated image coordinates (Xr, Yr) of (1, 1) are determined using the original image coordinates (Xo, Yo) as the rotation reference point. When the value of Y is increased by 1, the second initial values (−m, n) are accumulated. The above step is repeated N−1 times. Then when the value of X is increased by 1, the first initial values (n, m) are accumulated. The above steps are repeated M−1 times.

Figure 2:
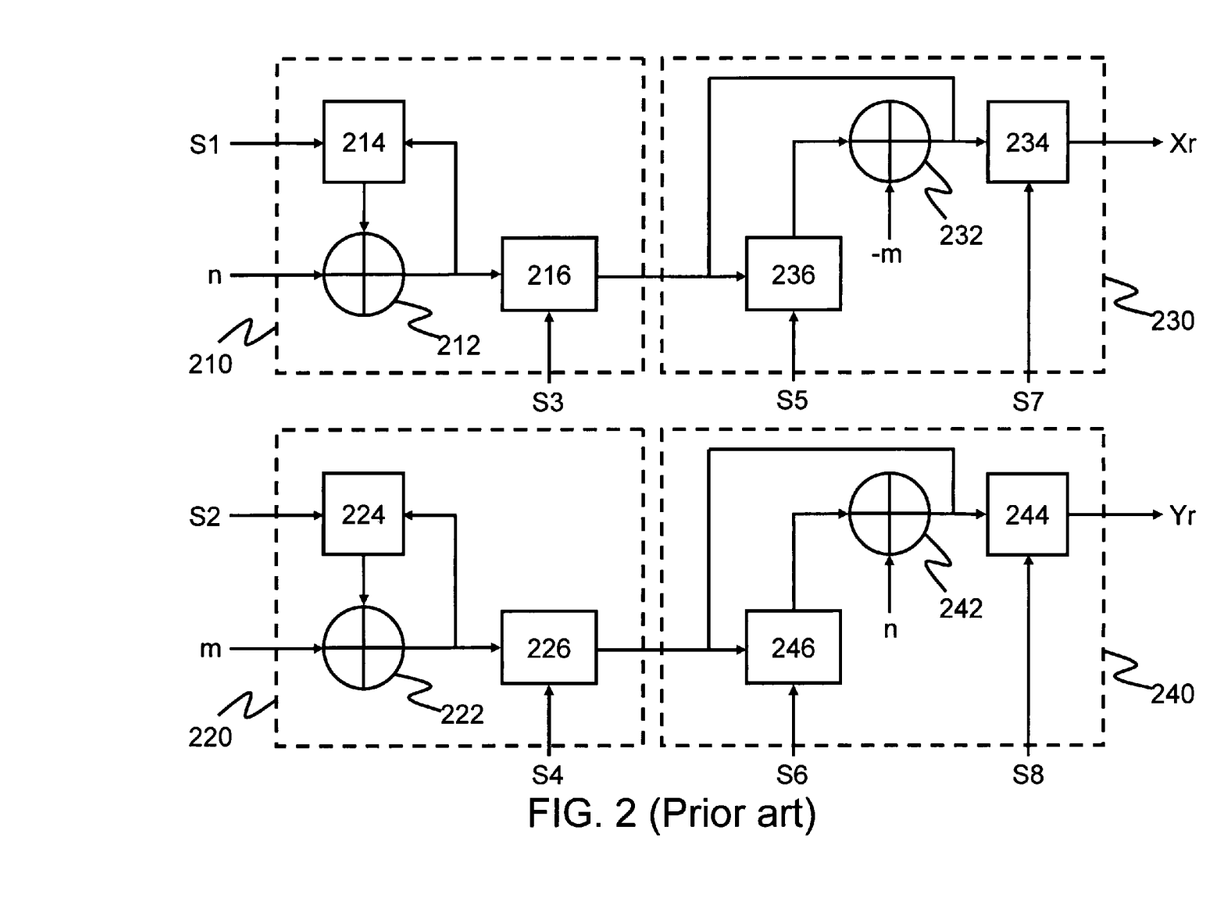
FIG. 2 is a structural diagram of the image rotation device for skewed images in the prior art.

As shown in FIG. 2, the image rotation device includes four accumulator circuits 210, 220, 230, 240. Each accumulator circuit 210, 220, 230, or 240 includes: a adder 212, 222, 232, or 242 for summing the cosine value n or the sine value m and the accumulated value, a register 214, 224, 234, or 244 for recording the added results and outputting the accumulated result to the adder 212, 222, 232, or 242 in response to a control signal S1, S2, S5, or S6, and a transmitting gate 216, 226, 236, or 246 for transmitting the added results of the adder 212, 222, 232, or 242 in response to a control signal S3, S4, S7, or S8. That is, the first accumulator circuit 210 accumulates corresponding the initial value n of the rotating angle θ of the X unit point (1, 0) when the X coordinate is increased by 1. The second accumulator circuit 220 accumulates corresponding the initial value m of the rotating angle θ of the X unit point (1, 0) when the X coordinate is increased by 1. The third accumulator circuit 230 adds the initial value −m of the rotating angle θ of the Y unit point (0, 1) to the output of the first accumulator 210. When the Y value is increased by 1, −m is added to the above-mentioned sum, thereby determining the value of Xr. The fourth accumulator 240 receives the output from the second accumulator 220 and determines the value of Yr using the same method as the third accumulator circuit 230.

In spite of the fact that this method is simpler than the previous method that totally use multipliers, this method requires the use of four accumulators, and thus has a higher cost and a more complicated operating scheme. Therefore, there is still room for finding a simpler circuit and calculation method so that the manufacturing cost can be reduced.

SUMMARY

In view of the foregoing, an objective of the invention is to provide an angle de-skew device and the method thereof to solve the many limitations and drawbacks in the prior art.

The disclosed angle de-skew device and the method thereof are used in an image processing system to rotate a skewed image by a skew angle according to a reference point as a skewed center, thereby obtaining a better output image.

The disclosed angle de-skew device and the method thereof use accumulator circuit and smaller logic elements to compute the transfer coordinates.

Moreover, the disclosed angle de-skew device and the method thereof compute individual coordinate transformations for the X and Y coordinates of each pixel.

The disclosed angle de-skew device and the method thereof accumulates the X coordinate of the previous pixel by a first compensation to obtain a new X coordinate. The new Y coordinate is obtained in an analogous way. That is, the rotated X coordinate value is obtained through accumulation from the X coordinate of the first pixel, and the rotated Y coordinate value is obtained through accumulation from the Y coordinate of the first pixel.

To achieve the above objective, the disclosed angle de-skew device is applied in an image processing system to rotate a skewed image according to a reference point as a skewed center. It includes: a first accumulator circuit, a second accumulator circuit, and a counter.

The first accumulator circuit accumulates the X coordinate of a first pixel in the skewed image by a first offset and outputs more than one first sum to the image processing system. The second accumulator circuit accumulates the Y coordinate of the first pixel by a second offset and outputs more than one second sum to the image processing system. The counter is connected to the first and second accumulator circuits to control the number of times accumulations are done in the first and second accumulator circuits.

Each of the first and second accumulator circuits includes: an adder to add a offset and outputs the summed result; a delay circuit to receive the summed result output from the adder and feeds the summed result back to the adder according to a control signal; and a buffer to receive the summed result output from the delay circuit and outputs the summed result to the image processing system according to the control signal in order to rotate the skewed image.

The buffer can be a first-in-first-out (FIFO) buffer. The counter controls the time of accumulations according to the angle the skewed image should rotate. The first and second offsets are set according to practical needs. The first and second summed results output from the first and second accumulator circuits each time are the transferred coordinate values of each pixel; thereby the transferred coordinates of all the pixels on the same vertical/horizontal line can be obtained by each output.

In addition, an angle de-skew method is disclosed in the invention for an image processing system to rotate a skewed image according to a reference point as a rotated center. The method includes the following steps. First, the X coordinate value of a first pixel in the skewed image is accumulated by a first offset. In addition, the Y coordinate value of the first pixel is accumulated by a second offset. Then the number of times that accumulations of the first and second offsets should be done is computed according to the angle to which the skewed image should be rotated. Finally, each accumulation result is output in sequence to the image processing system, wherein the skewed image is rotated by the image processing system according to the accumulation results.

The accumulation result output each time is the transferred coordinate values of each pixel in the skewed image. The first and second offsets are determined according to practical needs.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE INVENTION

Reference will now be made in detail to the preferred embodiments of the present invention, examples of which are illustrated in the accompanying drawings Hereinafter, the embodiments of the present invention will be described in detail with reference to FIGS. 3 to 6. The angle de-skew method compute the transferred X and Y coordinates for each pixel on the same vertical or horizontal line.

Figure 3:
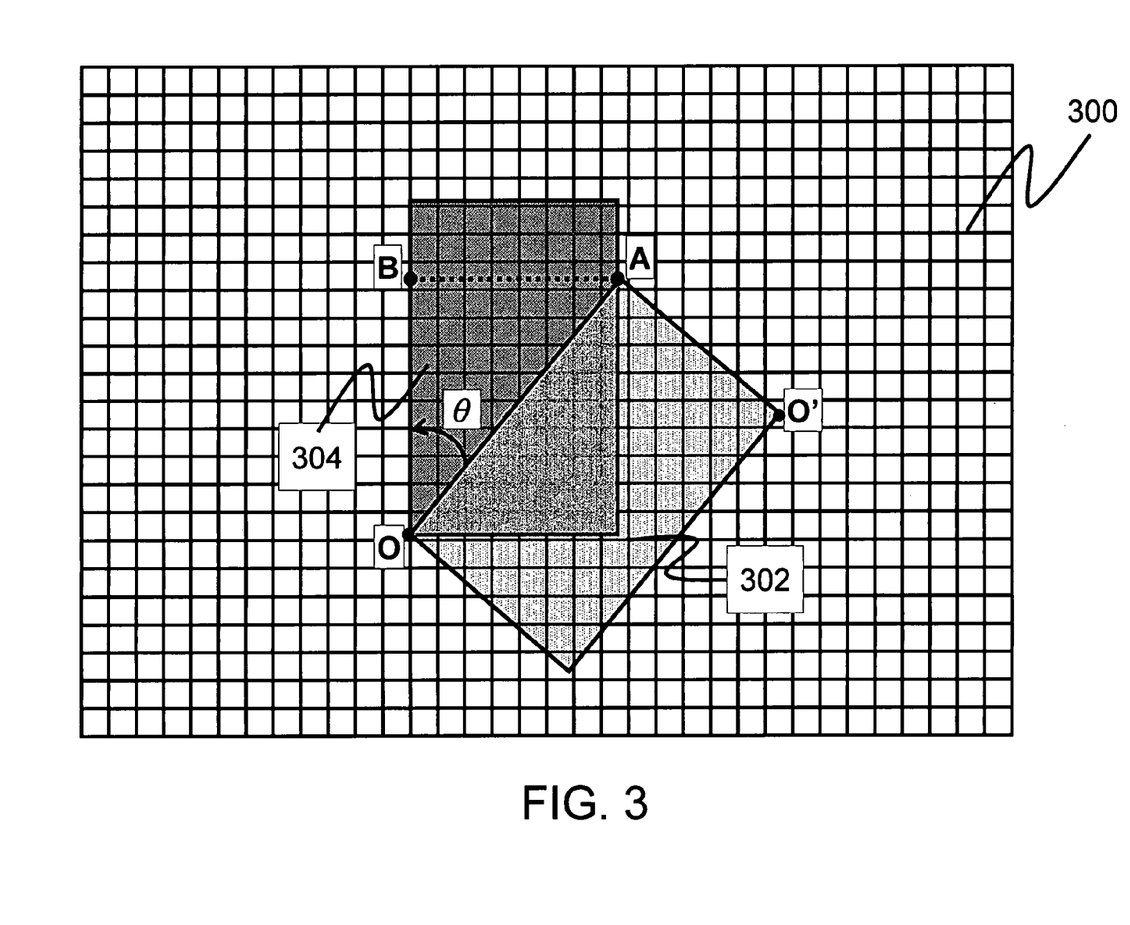
FIG. 3 is a schematic view of computing the rotated X coordinate according to an embodiment of the invention.
Figure 4:
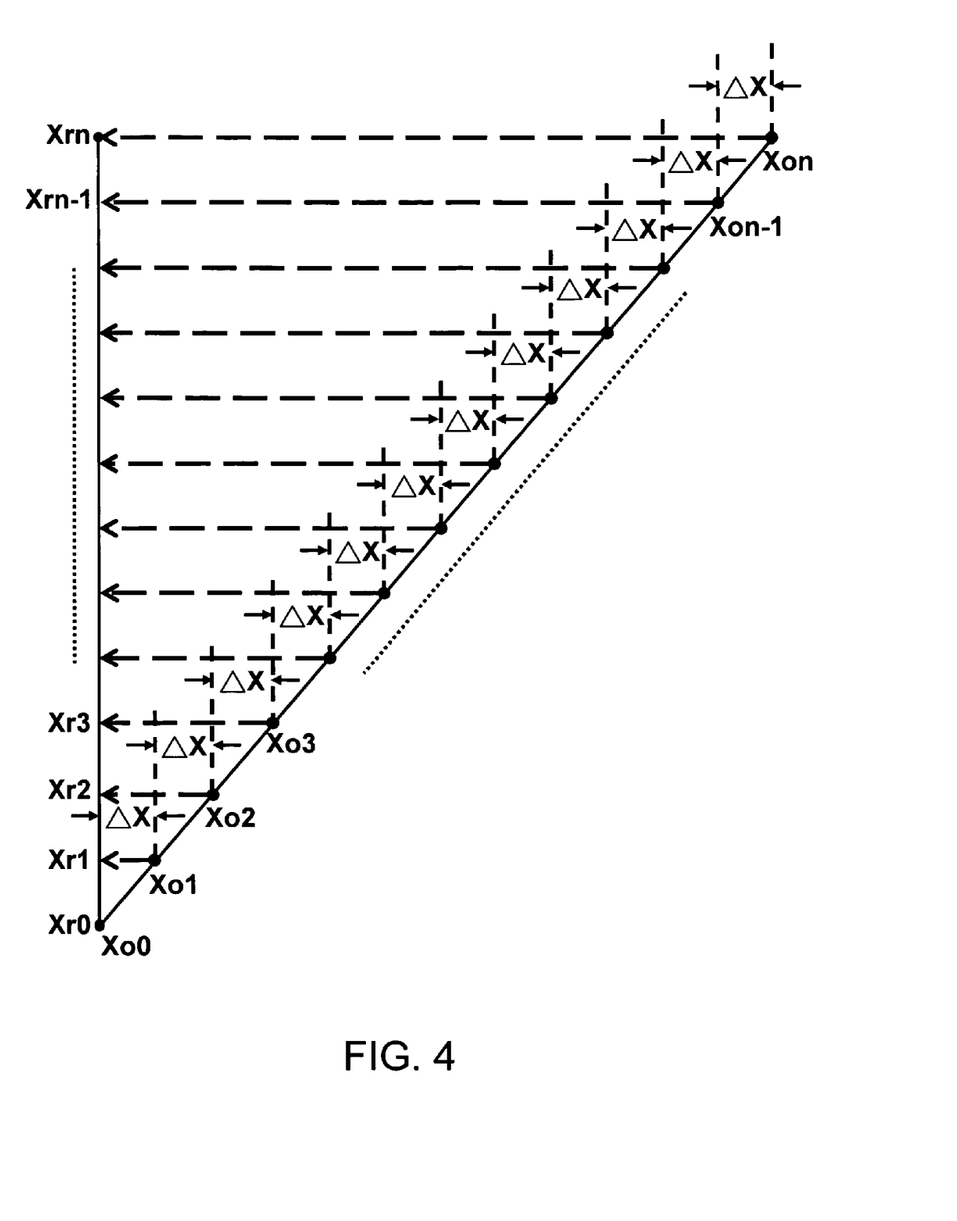
FIG. 4 is an exploded view of the ABO area in FIG. 3.

With reference to FIG. 3, a skewed original image 302 on the rectangular grid is rotated about point O to the left by an angle θ to obtain a less skewed rotated image 304. We expand the ABO area to explain the change in the X coordinate of each pixel on the same vertical line. In FIG. 4, the X coordinate $Xo0$ of the $0^{th}$ pixel is taken as the reference coordinate.

Therefore, the rotated X coordinate of the $0^{th}$ pixel $Xr0$ is $Xo0$. The X coordinate $Xo1$ of the first pixel is the X coordinate $Xo0$ of the $0^{th}$ pixel plus a offset $\Delta X$. Therefore, the rotated X coordinate $Xr1$ of the first pixel is obtained from $Xo1$ plus the offset $\Delta X$. The X coordinate $Xo2$ of the second pixel is the X coordinate $Xo1$ of the first pixel plus the offset $\Delta X$. Therefore, the rotated X coordinate $Xr2$ of the second pixel is the rotated X coordinate of the first pixel plus the offset $\Delta X$. Accordingly, the X coordinate $Xon$ of the nth pixel is the X coordinate $Xon-1$ of the $(n-1)$th pixel plus the offset $\Delta X$. Therefore, the rotated X coordinate $Xrn$ of the nth pixel is the rotated X coordinate of the $(n-1)$th pixel plus the offset $\Delta X$.

From the above description, we see that the rotated X coordinate of each pixel is that of the previous pixel plus a offset $\Delta X$. Therefore, the rotated X coordinate $Xr$ is the accumulation value of the first pixel. We thus obtain:

$$Xr0 = Xo0, \text{ and } Xrn = Xrn-1 \Delta X.$$

On the other hand, in FIG. 3, if a skewed original image 302 on the rectangular grid 300 is rotated about point O' to the right by an angle θ, then we have the equations:

$$Xr0 = Xo0, \text{ and } Xrn = Xrn-1 + \Delta X.$$

Therefore, we know the X coordinates of all pixels in the same vertical direction are rotated in the following way:

$$Xr0 = Xo0, \text{ and } Xrn = Xrn-1 \pm \Delta X.$$

Figure 5:
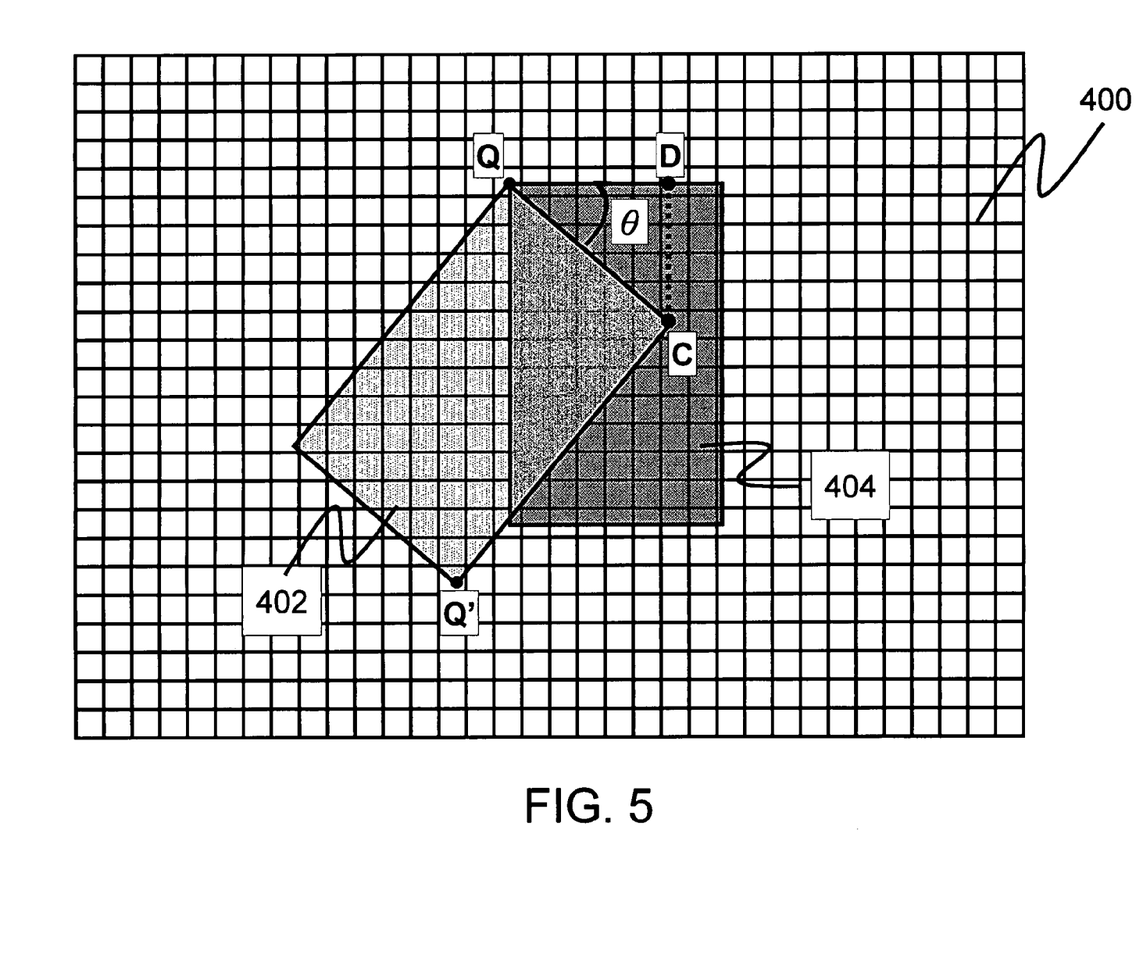
FIG. 5 is a schematic view of computing the rotated Y coordinate according to an embodiment of the invention.
Figure 6:
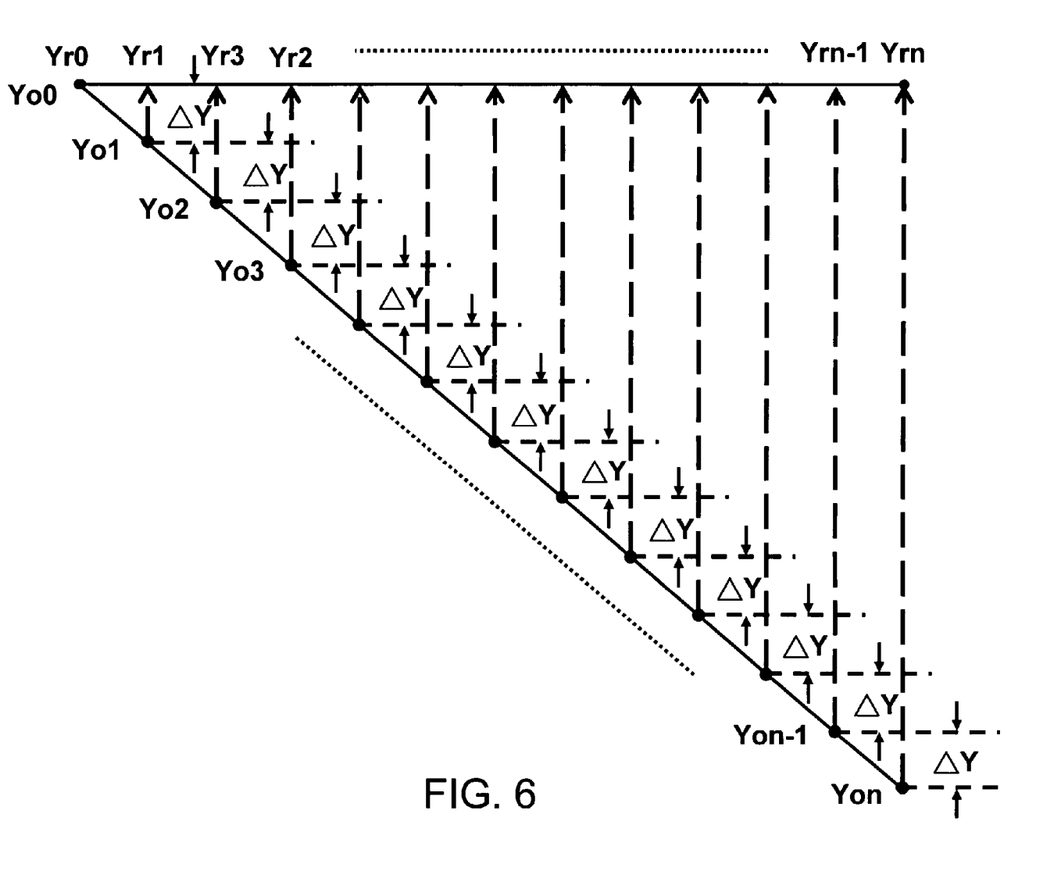
FIG. 6 is an exploded view of the QDC area in FIG. 5.

Now let's take a look at the Y coordinates. As shown in FIG. 5, a skewed original image 402 on the rectangular grid 400 is rotated about point Q to the left by an angle θ to obtain a de-skewed rotated image 404. We expand the CDQ area to explain the change in the Y coordinate of each pixel on the same horizontal line. In FIG. 6, the Y coordinate $Yo0$ of the $0^{th}$ pixel is taken as the reference coordinate. Therefore, the rotated Y coordinate of the $0^{th}$ pixel $Yr0$ is $Yo0$. The Y coordinate $Yo1$ of the first pixel is the Y coordinate $YoO$ of the $0^{th}$ pixel plus a offset $\Delta Y$. Therefore, the rotated Y coordinate $Yr1$ of the first pixel is obtained from $Yo1$ plus the offset $\Delta Y$. The Y coordinate $Yo2$ of the second pixel is the Y coordinate $Yo1$ of the first pixel plus the offset $\Delta Y$. Therefore, the rotated Y coordinate $Yr2$ of the second pixel is the rotated Y coordinate of the first pixel plus the offset $\Delta Y$. Accordingly, the Y coordinate $Yon$ of the nth pixel is the Y coordinate $Yon-1$ of the $(n-1)$th pixel plus the offset $\Delta Y$. Therefore, the rotated Y coordinate $Yrn$ of the nth pixel is the rotated Y coordinate of the $(n-1)$th pixel plus the offset $\Delta Y$.

From the above description, we see that the rotated Y coordinate of each pixel is that of the previous pixel plus a offset $\Delta Y$. Therefore, the rotated Y coordinate $Yr$ is the accumulation value of the first pixel. We thus obtain:

$$Yr0 = Yo0, \text{ and } Yrn = Yrn-1 - \Delta Y.$$

On the other hand, in FIG. 5, if a skewed original image 402 on the rectangular grid 400 is rotated about point O' to the right by an angle θ, then we have the equations:

$$Yr0 = Yo0, \text{ and } Yrn = Yrn-1 + \Delta Y.$$

Therefore, we know the Y coordinates of all pixels in the same vertical direction are rotated in the following way:

$$Yr0 = Yo0, \text{ and } Yrn = Yrn-1 \pm \Delta Y.$$

Figure 7:
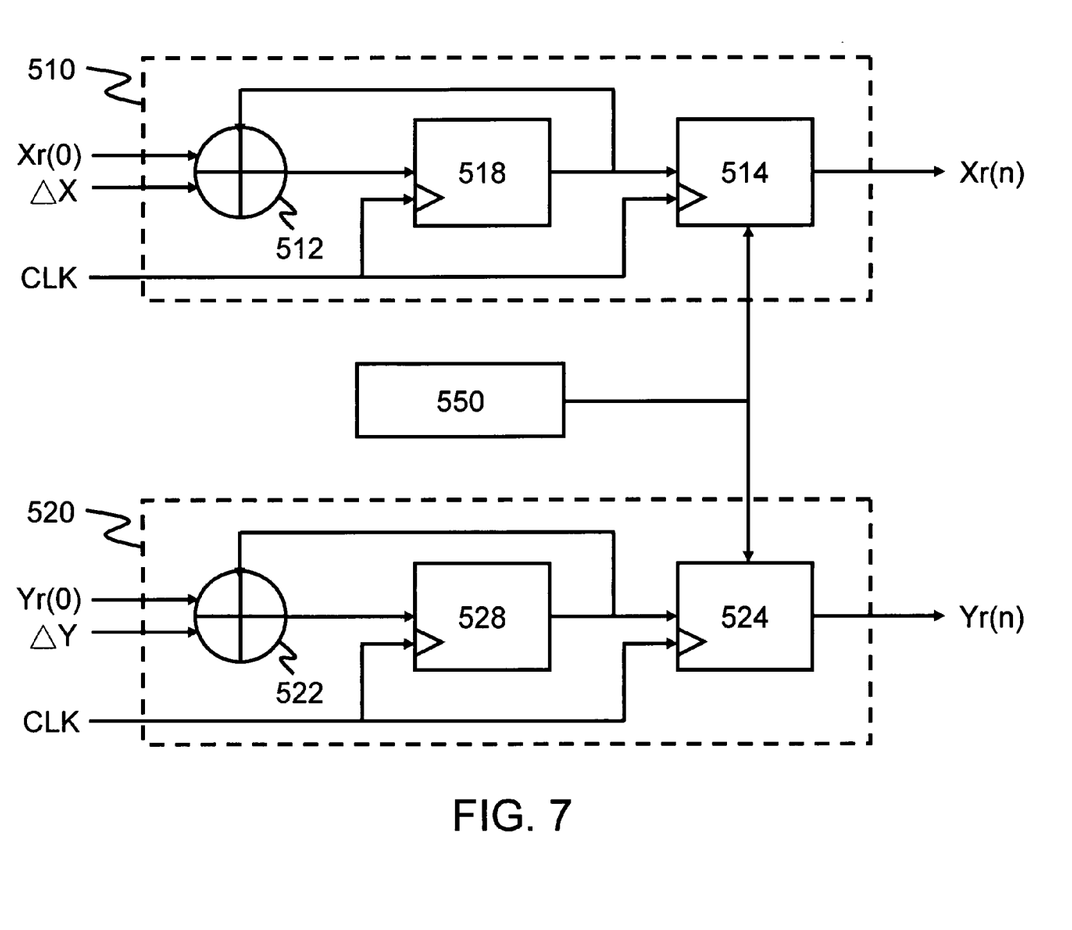
FIG. 7 is a structural diagram of the image rotation device according to an embodiment of the invention.

Moreover, the above equations can be computed using a transfer device. As shown in FIG. 7, the transfer device used in an image processing system rotates a skewed image according to a reference point as a rotated center. It includes a first accumulator circuit 510, a second accumulator circuit 520, and a counter 550. The first accumulator circuit 510 is used to accumulate the X coordinate of the first pixel in the skewed image by a first offset and outputs more than one first accumulation result to the image processing system. The second accumulator circuit 520 is used to accumulate the Y coordinate of the first pixel in the skewed image by a second offset and outputs more than one second accumulation result to the image processing system. The counter 550 is connected to the first and second accumulator circuits 510, 520 to control the number of times of doing accumulations.

The accumulation results output by the two accumulator circuits 510, 520 are the coordinate transfer values of each pixel in the skewed image. That is, the first and second accumulation results are respectively the X and Y coordinates of each pixel in the skewed image. Thus, the image processing system can obtain the coordinate transfers of each pixel on the same vertical/horizontal line according to the first and second accumulation results. Moreover, the first and second offsets are predetermined according to practical needs yet cannot vary with the skewed angle. Therefore, the number of accumulations increases with the skewed angle. Therefore, the counter 550 controls the number of times of accumulations to be performed by the first and second accumulator circuits 510, 520 according to the angle to be rotated.

Each of the two accumulator circuits 510, 520 includes respectively adders 512, 522, delay circuits, and buffers 514, 524. The adders 512, 522 execute the accumulation of the first/second offset and output the accumulation results. The delay circuits 518, 528 receive the accumulation results output by the adders 521, 522, and feed the accumulations back to the adders 521, 522 according to a control signal CLK. The buffers 514, 524 receive the accumulation results output by the delay circuits 518, 528, and output the accumulation results to the image processing system according to the control signal CLK. Further, the image processing system transfers the skewed image.

The buffers 514, 524 may be first-in-first-out (FIFO) buffers. This type of buffers can output in sequence the received accumulation results. That is, the accumulation results are output according to the order they are received to the image processing system for rotating the skewed image.

The invention also provides an angle de-skew method for an image processing system to rotate a skewed image according to a reference point as a rotated center. The method includes the following steps. First, the X coordinate of a first pixel in the skewed image is added by a first offset, and the Y coordinate of a first pixel in the skewed image is added by a second offset. The angle that the skewed image is to be rotated is used to compute the numbers of times for accumulating the first and second offsets. Finally, the accumulation results are output in sequence to the image processing system, which then rotates the skewed image accordingly.

The output accumulation results are the coordinate transfer values of each pixel in the skewed image. Therefore, we obtain the transfer coordinates of all the pixels on the same vertical/horizontal lines. Moreover, the first and second offsets are predetermined according to practical needs.

When the angle de-skew device and the method thereof according to the invention is used in a multi-function product (MFP) or a printer, the image processing speed is indeed much faster than the prior art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An angle de-skew device used in an image processing system to rotate a skewed image according to a reference point as rotated center, comprising:
    a first accumulator circuit to accumulate X coordinate value of a first pixel of the skewed image by a first offset and to output one and upward first accumulation results into the image processing system;
    a second accumulator circuit to accumulate Y coordinate value of a first pixel of the skewed image by a second offset and to output one and upward second accumulation results into the image processing system; and
    a counter connected with the first and second accumulator circuit to control the number of accumulation times of the first and second accumulator circuits;
    wherein the first accumulator circuit includes:
    an adder to accumulate the first offset and output the first accumulation results;
    a delay circuit to receive the first accumulation results from the adder and feed the first accumulation results back to the adder according to a control signal;
    a buffer to receive the first accumulation results from the delay circuit and output the first accumulation results into the image processing system according to the control signal.

2. The angle de-skew device of claim 1, wherein the counter controls the number of accumulation times according to the angle that the skewed image is to be rotated.

3. The angle de-skew device of claim 1, wherein the buffer is a first-in-first-out (FIFO) buffer to output the first accumulation results according to the order the first accumulation results are received.

4. An angle de-skew device used in an image processing system to rotate a skewed image according to a reference point as rotated center, comprising:
    a first accumulator circuit to accumulate X coordinate value of a first pixel of the skewed image by a first offset and to output one and upward first accumulation results into the image processing system;
    a second accumulator circuit to accumulate Y coordinate value of a first pixel of the skewed image by a second offset and to output one and upward second accumulation results into the image processing system; and
    a counter connected with the first and second accumulator circuit to control the number of accumulation times of the first and second accumulator circuits,
    wherein the second accumulator circuit includes:
    an adder to accumulate the second offset and output the second accumulation results;
    a delay circuit to receive the second accumulation results from the adder and feed the second accumulation results back to the adder according to a control signal;
    a buffer to receive the second accumulation results from the delay circuit and output the second accumulation results into the image processing system according to the control signal.

5. The angle de-skew device of claim 4, wherein the buffer is a first-in-first-out (FIFO) buffer to output the second accumulation results according to the order the second accumulation results are received.

6. An angle de-skew method used in an image processing system to rotate a skewed image according to a reference point as a rotated center, comprising the steps of:
   accumulating a X coordinate value of a first pixel of the skewed image by a first offset and accumulating a Y coordinate value of a first pixel of the skewed image by a second offset;
   computing the number of accumulation times of the first and second offsets according to the angle that the skewed image is to be rotated; and
   outputting accumulation results in sequence to the image processing system, wherein the image processing system rotates the skewed image according to the accumulation results.

7. The angle de-skew method of claim 6, wherein the accumulation results output each time are the coordinate transfer values of each pixels in the skewed image.

* * * * *